United States Patent [19]
Martin et al.

[11] 4,281,521
[45] Aug. 4, 1981

[54] FLUIDIZED FREEZING

[75] Inventors: Walter H. Martin; George C. Briley; Peter Y. Pao, all of San Antonio, Tex.

[73] Assignee: Refrigeration Engineering Corporation, San Antonio, Tex.

[21] Appl. No.: 100,527

[22] Filed: Dec. 5, 1979

[51] Int. Cl.³ .......................................... F25D 25/04
[52] U.S. Cl. .......................................... 62/380; 62/57; 198/551; 198/600; 198/952
[58] Field of Search .......................... 62/63, 380, 57; 198/952, 551, 600

[56] References Cited

U.S. PATENT DOCUMENTS

| 1,202,574 | 10/1916 | Parker | 198/551 |
| 2,223,972 | 12/1940 | Sterling | 62/380 |
| 2,365,838 | 12/1944 | Perkins | 164/68 |
| 2,402,921 | 6/1946 | Sharpe | 62/380 |
| 3,115,756 | 12/1963 | Overbye | 62/57 |
| 3,122,897 | 3/1964 | Overbye | 62/57 |
| 3,807,186 | 4/1974 | Hardy | 62/57 |
| 3,982,404 | 9/1976 | Overbye | 62/57 |
| 4,186,566 | 2/1980 | AuYoung | 62/57 |

Primary Examiner—Ronald C. Capossela
Attorney, Agent, or Firm—Watson, Cole, Grindle & Watson

[57] ABSTRACT

Articles of food to be frozen are delivered to an article conditioning conveyor and are maintained in a fluidized state by refrigerated air flowing upwardly therethrough. The conveyor is driven forwardly but is interrupted by at least one downward stepping movement, causing a thinning of the product bed and a rapid increase in air velocity to thus cool and separate the food articles preventing them from freezing to one another. The food articles are thereafter subjected to deep bed mass fluidization by flowing freezing air therethrough in a fluidized state.

9 Claims, 6 Drawing Figures

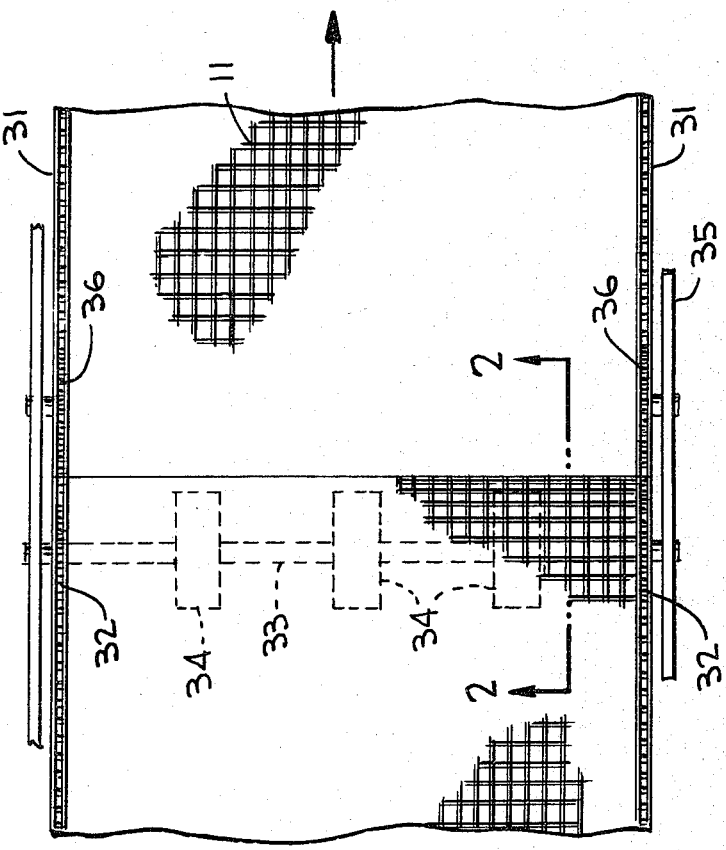
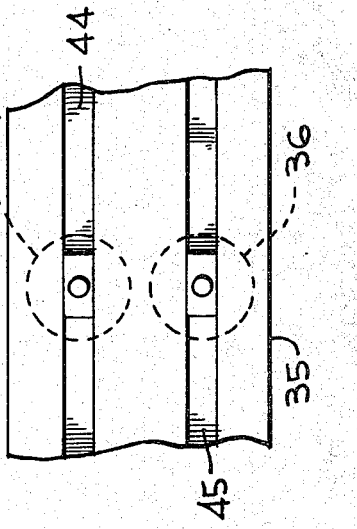
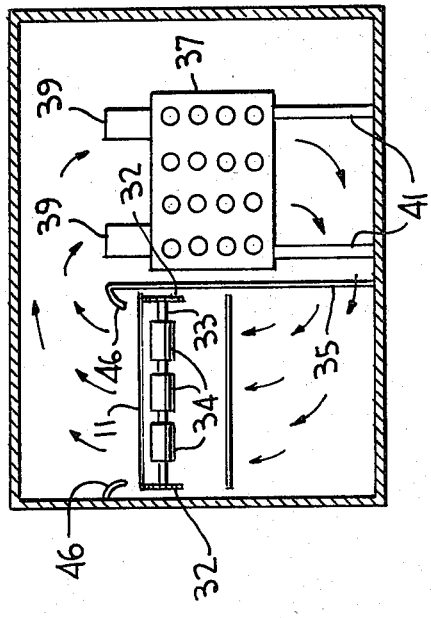
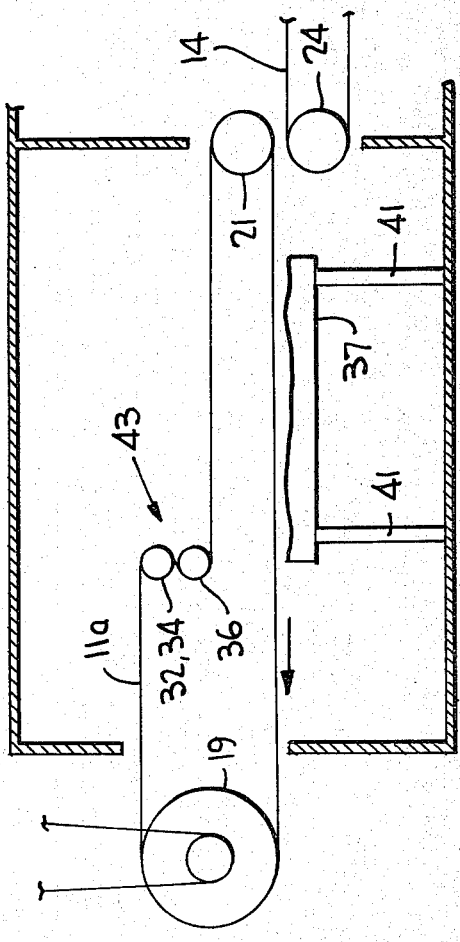

FLUIDIZED FREEZING

BACKGROUND OF THE INVENTION

This invention relates generally to an improved method and apparatus for the freezing of comestibles using I.Q.F. (individually quick-frozen) techniques in which the articles in a "fluidized" bed are frozen in an individually separate state rather than in a coherent state. More particularly, such improvements relate to the manner of conditioning the food articles in a fluidized state before being subjected to deep bed mass fluidization in a fluidized state.

A dual conveyor I.Q.F. system for deep freezing of food articles is disclosed by U.S. Pat. No. 3,982,404. The food articles to be frozen are deposited on a first conveyor and are subjected to an upward flow of gas at subfreezing temperature for a first period of time to substantially remove all the above-freezing sensible heat from the food articles without removing the latent and sensible heat. The articles are then subjected to another deeper bed deposit and the gases are flowed upwardly therethrough for a longer time period than the first period so as to remove all the remaining latent heat from the articles.

The aforedescribed dual tandem system thus includes an article-conditioning first stage operated together with a deep bed fluidization second stage freezer. While recognizing the advantages of this dual freezer system, the article-conditioning first stage is not without its shortcomings. Different food products to be frozen (e.g., beans vs. strawberries) require different article conditioning measures to be taken to insure that the food articles are individually frozen without sticking upon leaving the deep bed fluidization second stage. Caking of the food articles persists despite subjecting them in the first stage, as in the prior art, to subfreezing temperature for a relatively short period of time.

SUMMARY OF THE INVENTION

It is therefore an object of the present invention to provide an I.Q.F. fluidized product freezer and method of the tandem dual conveyor type having an improved article-conditioning first stage for individually freezing food articles without sticking regardless of the type of food articles to be frozen. The present apparatus is thus more efficient in its operation, easier and less costly to manufacture, easier to operate, occupies less space and requires less energy to operate as compared to prior I.Q.F. freezers.

Another object is to provide such an apparatus and process wherein the article-conditioning first stage thereof is improved by the provision of at least one "fluidization initiator" which will direct and move the product bed to different depths. This first stage is constituted by an endless, foraminous belt conveyor supporting the articles to be frozen before subjecting them to a second stage deep bed fluidization freezing created by gas at subfreezing temperatures flowing upwardly through the food articles. The "fluidization initiator" of the first stage effects variation in product depth so that the refrigerated air blown upwardly through the belt and the food articles supported thereon increases rapidly to cool and separate the product so as to prevent the food articles from freezing to one another.

More specifically, a stepped formation in the first stage conveyor belt consitutes the "fluidization initiator" which results in a thinning of the product bed depth as the food articles fall from a higher to a lower elevation thereby exposing practically individual food articles to the refrigerated air blowing upwardly through the belt.

A further object of this invention is to provide such a product freezer and process wherein a series of such "fluidization initiators" are made part of the first stage article-conditioning belt, depending on the degree of the conditioning required for particular food articles to be frozen subsequently be deep-bed mass fluidization.

A still further object is to provide such a "fluidization initiator" for the first stage belt wherein the stepped formation is effected by the provision of two sets of adjacent and slightly spaced roller sets respectively engaging the lower and upper surfaces of the belt. In one embodiment, the roller sets may be disposed horizontally and several sets of such rollers spaced horizontally apart at predetermined distances depending on the product to be frozen. In another embodiment, a single stepped formation is formed by such sets of rollers disposed vertically and capable of being horizontally adjusted for assuring individual freeze conditioning of the product depending on the type to be frozen.

Other objects, advantages and novel features of the invention will become more apparent from the following detailed description of the invention when taken in conjunction with the accompanying drawings.

BRIEF DESCRIPTION OF THE DRAWINGS

FIG. 3 is a cross-sectional view taken substantially along line 3—3 of FIG. 1;

FIG. 4 is a top plan view in reduced scale, taken substantially along line 4—4 of FIG. 2;

FIG. 5 is a view similar to FIG. 1 showing another embodiment of the article-conditioning first stage belt conveyor according to the invention; and FIG. 6 is a detail view generally showing the horizontal adjustment arrangement for the roller sets of FIG. 5.

DETAILED DESCRIPTION OF THE INVENTION

Figure 1:
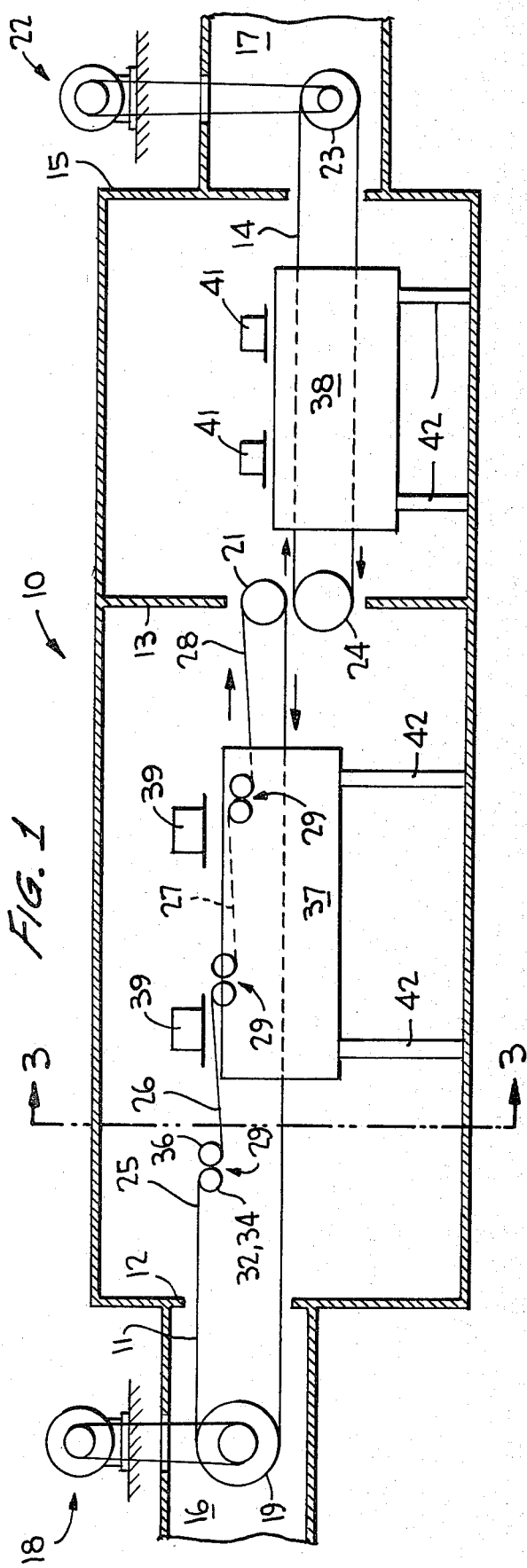
FIG. 1 is a longitudinal sectional view of an I.Q.F. fluidized product freezer embodying the invention.
Figure 2:
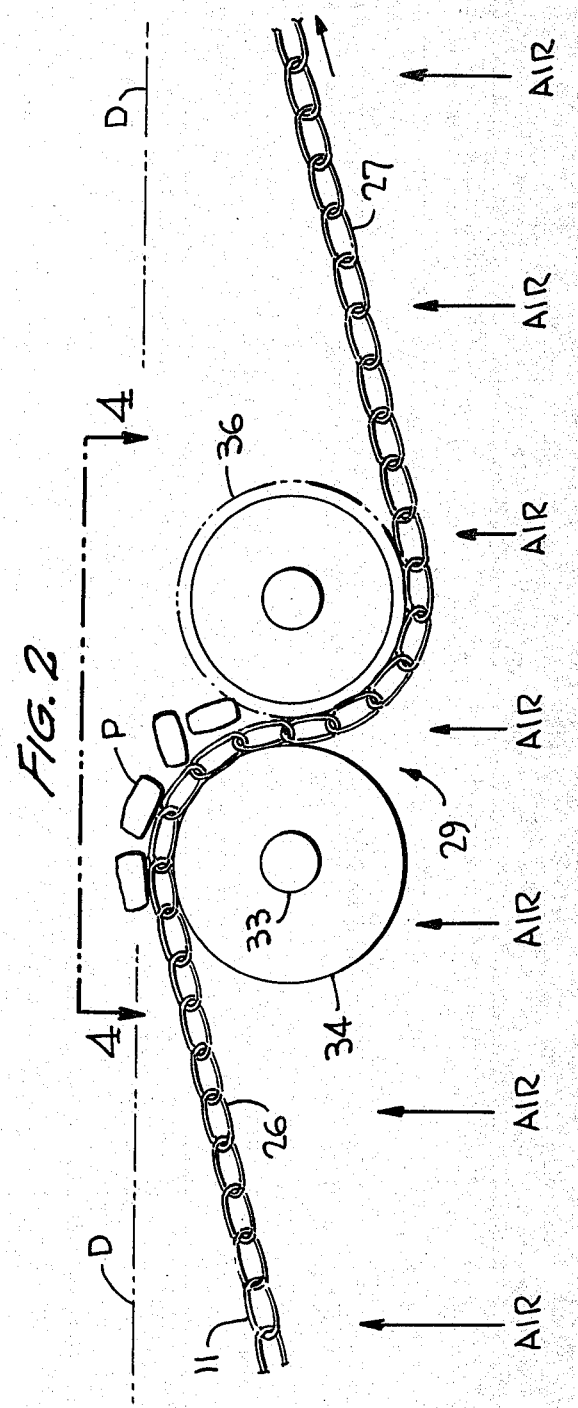
FIG. 2 is an enlarged side elevational view of a portion of the first stage belt conveyor showing the induced stepped formation thereof, and taken substantially along line 2—2 of FIG. 4.

Turning now to the drawings wherein like reference characters refer to like and corresponding parts throughout the several views, the dual conveyor I.Q.F. fluidized product freezing system of the invention is contained within an elongated housing or tunnel, generally designated 10, having insulated walls. An improved input or article conditioning conveyor 11, has its loading end extending through end wall 12 and its opposite end extending through a divider wall 13. The system further includes an output or deep bed fluidization conveyor 14 lying below and in tandem with conveyor 11 and having an end extending through wall 13 and an opposite end extending through end wall 15. Food articles to be frozen are deposited on conveyor 11 at loading station 16 by any accepted means known in this art. At the opposite end of enclosure 10, the deep-frozen articles discharged by deep bed fluidization conveyor 14 are unloaded at station 17 in any normal manner for further processing or otherwise.

Conveyor 11 is driven by a motor drive 18 (hydraulic or electric) operatively engaged with a drive wheel or roller 19. The conveyor comprises an endless, foraminous belt entrained about roll 19 and an idler roller 21, both such rollers being rotatably mounted in place in any normal manner. Similarly, conveyor 14 is driven by motor assembly 22 (hydraulic or electric) operably interconnected to a drive roll 23, conveyor 14 being entrained about this roll as well as in idler roll 24. Both conveyors are driven in the direction of the arrows shown in FIG. 1, and are typically of a foraminous construction comprising an open gridwork of articulated rows of spaced links which permit free passage of air upwardly through the belts while supporting any of the various vegetables, fruits, berries, seafoods or beef articles of food to be frozen. The lower run of conveyor 11 is substantially horizontal, and the upper run has a plurality of end-to-end sections 25, 26, 27 and 28 with a stepped formation, generally designated 29, therebetween. Three of such formations are shown in FIG. 1, although it should be understood that more than three can be provided, and at least one stepped formation is required, depending on the food articles to be frozen. Conveyor belt 11 is disposed to one side of the housing as shown in FIG. 3, and is constructed as having endless sprocket chains or belts mounted at opposite sides thereof. Each stepped formation comprises a pair of sprockets 32 of one set mounted on a common shaft 33 and being respectively in toothed engagement with chains 31. A plurality of rollers 34 are mounted on shaft 33 for rotation together therewith, and the shaft is rotatably mounted at one end to a side wall of housing 10 and at its opposite end to a support member 35 (see FIG. 3). As shown in FIGS. 1 to 4, rollers 34 and sprockets 32 engage a lower surface of the upper run of conveyor 11 at each stepped formation 29. A cooperating set of rollers or sprockets 36 engage the upper surface (at chains 31) of the upper run of the conveyor, one of the sprockets being mounted for rotation on a side wall of the housing, and the other sprocket being mounted on support 35, with both sprockets being coaxial. Sprockets 32 and their associated rollers 34 of the one set are shown to be of the same size, and sprockets 36 of the other set are shown to be of an equal size although it is possible for the sets to be of different roll and sprocket sizes relative to one another, without departing from the invention, in order to vary the magnitude of the stepped formation depending on the food product to be frozen. Regardless of relative sizes between the sets, they must be spaced apart sufficiently (see FIG. 2) to permit endless belt 11 to pass therebetween.

Disposed immediately beside the conveyor belts 11 and 14 are one or more sets of refrigeration coils 37 and 38 which are sufficiently wide and long for forming adequate cooling grids. Alternatively, the coils could be disposed immediately below belts 11 and 14 without departing from the invention. Refrigerated air is continuously circulated (as shown by the arrows in FIG. 3) through conveyor 11 and the product bed supported thereon and through evaporated coils 37 by a plurality of axial fans 39 which develop a fan horsepower which varies depending on their requirements. Circulation by fans 41 associated with coils 38 are provided for deep bed fluidization of the product traveling on conveyor 14 (the continuous air movement being typically shown in FIG. 3). And, both evaporator coils are mounted on the floor of the housing as by means of supports 41, 42.

The stepped formations are at different elevations with the upstream formation being at the highest elevation, the next being lower, and the next the lowest. With such an arrangement, section 25 of the upper run is substantially horizontal, and sections 26, 27 and 28 are slightly inclined in a forward direction. Thus, the product to be frozen moves along section 25 of the upper run and the product bed thins as it falls (and tumbles depending on the type of product) at each stepped formation as typically shown in FIG. 2. The air velocity of the refrigerated air (see AIR arrows in FIG. 2) increases rapidly during this falling or tumbling action of the product, thus cooling and separating the product so as to prevent it from freezing and sticking to one another, while in a fluidized condition on conveyor 11. These depth formations may therefore each be considered as a "fluidization initiator" since they function to condition the product for deep bed fluidization on belt 14. Also, because of the forward inclines of sections 26, 27 and 28, the depth D of the product bed varies so as to thin out from the downstream to the upstream ends of the inclined sections (see FIG. 2). This additional variation in product depth effects a sequential and gradual thinning of the product bed thereby causing a concomitant increase in air velocity and cooling of the product at subfreezing temperature developed by coils 37 which further minimize any tendendy for article cohesion before the articles are delivered to the deep fluidized bed of the second stage conveyor. It should be pointed out, however, that sections 26, 27 and 28 can each be substantially horizontal depending on the length of each section, the number of stepped formations, the length of the tunnel, etc., without departing from the invention. And, conveyor 11 may be driven at a faster rate of speed relative to conveyor 14 depending on the type of product to be frozen, or the two conveyor belts may be driven at the same speed using a common drive since the increased velocity of the cooling air effected by the stepped formations may adequately, for a particular product, initiate individual freezing without product cohesion without the dwell time required between moving conveyors as in the prior art.

In accordance with another embodiment, conveyor 11a of FIG. 5 is the same in construction and arrangement as the aforedescribed conveyor 11 except that stepped formation 43 is induced into the upper run of the conveyor by an upper set of sprockets 32 and rolls 34 and by a lower set of sprockets 36, respectively disposed in a vertical plane. Sections of the upper run on either side of the stepped formation lie in different horizontal planes, and both sets are capable of horizontal adjustment so as to vary the situs of the stepped formation depending on the type of food product to be frozen by the pre-conditioning conveyor before being deposited onto the deep bed fluidization conveyor. Adjustment may be effected in any normal manner as by movement of the roll set in either direction of the double arrows of FIG. 6 along slots 44, 45, and tightening them in place after shifting. An increase in air velocity of the subfreezing refrigerated air circulated through coils 37 increases rapidly, similarly as aforedescribed, as the food articles fall between the different elevations induced into the upper run of conveyor 11a to thereby cool and separate the articles preventing them from freezing to one another. The adjustability feature of the roll sets, which may include an adjustment of the belt speed, is advantageous for selecting a desired location at which to thin the product bed by allowing the articles to fall so as to enhance individual freezing for the particular type of product to be frozen depending on the size and nature of the food articles or depending on more or less washwater or moisture from natural juices present thereby requiring a different location at which air velocity through product bed is to be increased.

For both embodiments, product guards 46 are mounted in place in any suitable manner with the contour thereof matching that of conveyors 11 and 11a.

Also, the I.Q.F. apparatus according to the invention may include only a single endless conveyor belt 11 arranged in and functioning in an identical manner as described above except that the forward end (to the right in FIGS. 1 and 5) would extend outwardly of housing 10 so that the deep-frozen articles discharged by conveyor 11 would be unloaded at station 17. Thus, the single conveyor, having one or more "fluidization initiators" 29, functions to condition the product for deep bed fluidization (by means of coils 37, or the like) on section 28 thereof which may be of a longer extent than shown in FIG. 1. Thus, in a single belt system, conveyor 14, and its accompanying coils 38, fans 41 and support 42, would be eliminated. And, the single conveyor could include one or more adjustable stepped formations 43, as in FIG. 5, without departing from the invention.

Obviously, many modifications and variations of the present invention are made possible in the light of the above teachings. It is to be therefore understood that within the scope of the appended claims, the invention may be practiced otherwise than as is specifically described.

What is claimed is:

1. In a I.Q.F. apparatus for processing articles of food, including a deep bed gas-fluidization freezing means for deep freezing the articles disposed in a deep-bed fluidized condition created by air at subfreezing temperature blown upwardly therethrough, a freezer conveyor for conveying the articles from a receiving to a discharge location during the deep freezing thereof, a separate article conditioning conveyor for delivering the articles from a loading station onto said freezer conveyor at said receiving station, and means for chilling the articles to near freezing temperature by blowing air at subfreezing temperature upwardly through the articles on said conditioning conveyor with said articles being in a fluidized condition, the improvement wherein said conditioning conveyor comprises an endless, foraminous conveyor belt having a horizontal lower run, means engaging the upper run of said belt providing at least two sections of said upper run with a stepped formation between said sections, an end of one of said sections lying at a higher elevation than an adjacent end of the other of said sections, said stepped formation effecting a thinning in the bed of articles passing therethrough whereby to rapidly increase the air velocity through the articles on said conditioning conveyor so as to cool and separate the articles preventing them from sticking and freezing to one another before being subjected to deep bed gas-fluidization.

2. In the apparatus according to claim 1, wherein said means engaging said upper run of said belt function to provide a plurality of sections of said upper run with stepped formations between adjacent ones of said sections.

3. In the apparatus according to claim 1 or 2, wherein said engaging means comprises first roll means engaging the lower surface of said upper run and second roll means engaging the upper surface of said upper run, said second roll means lying adjacent and downstream and spaced from said first roll means.

4. An I.Q.F. freezer for processing foor articles, including an article conditioning conveyor in the form of an endless, foraminous belt onto the upper run of which the articles to be frozen are delivered at a loading station and are thereby carried to a receiving station through a freezing zone established by chilling means provided for blowing refrigerated air upwardly through said belt and the food particles thereon, a separate freezing conveyor for receiving the articles at said receiving station from said conditioning conveyor and conveying them to a discharge location, freezing means for effecting a dee-bed gas fluidization of the articles on said freezing conveyor, the improvement wherein said endless belt comprises at least two end-to-end sections separated by a transitional section extending toward the lower run of said conveyor, roll means engaging lower and upper surfaces of said upper run for the formation of said transitional section, said roll means causing the articles to descend during delivery to said receiving station, said transitional section effecting a thinning in the bed of articles passing therethrough whereby to rapidly increase the air velocity through the articles on said conditioning conveyor so as to cool and separate the articles preventing them from sticking and freezing to one another before being subjected to deep bed gas-fluidization.

5. An I.Q.F. apparatus for processing articles of food, comprising an endless foraminous belt onto the upper run of which the articles to be frozen are delivered at a loading station and are thereby carried to an unloading station through a freezing zone established by freezing means provided for blowing refrigerated air upwardly through said belt and the food articles thereon and for effecting a deep-bed gas fluidization of the articles, said belt comprising at least two end-to-end sections separated by a transitional section extending toward the lower run of said conveyor, roll means engaging lower and upper surfaces of said upper run for the formation of said transitional section, said roll means causing the articles to descend during movement toward said unloading station, said transitional section effecting a thinning in the bed of articles moving therethrough whereby to rapidly increase the air velocity through the articles on said conditioning conveyor so as to cool and separate the articles preventing them from sticking and freezing to one another before being subjected to deep-bed gas fluidization.

6. An apparatus according to claim 4 or 5, wherein said roll means comprises two sets of rolls respectively engaging said lower and upper surfaces, said sets of rolls having their axes lying in a horizontal plane.

7. An apparatus according to claim 4 or 5, wherein said roll means comprises two sets of rolls respectively engaging said lower and upper surfaces, said sets of rolls having their axes lying in a vertical plane.

8. An apparatus according to claim 4 or 5, wherein said belt comprises a plurality of end-to-end sections separated by transitional sections extending toward said lower run and spaced along said upper run, said roll means engaging said surfaces for the formation of said transitional sections.

9. An apparatus according to claim 7, wherein said sets of rolls are mounted for adjustment to a predetermined location along said upper run for changing the location of said transitional section.

* * * * *

UNITED STATES PATENT OFFICE
CERTIFICATE OF CORRECTION

PATENT NO. : 4,281,521

DATED : August 4, 1981

INVENTOR(S) : Walter H. Martin et al.

It is certified that error appears in the above-identified patent and that said Letters Patent are hereby corrected as shown below:

Column 6, line 3, delete "foor" insert --food-- line 30, after "belt" insert --conveyer-- line 46, after "said" delete "conditioning"

Signed and Sealed this

Eighth Day of December 1981

[SEAL]

Attest:

Attesting Officer

GERALD J. MOSSINGHOFF

Commissioner of Patents and Trademarks